Dec. 17, 1957  J. HUDAK  2,816,595
APPARATUS FOR REINFORCING AND COATING RODS
Filed Sept. 27, 1954
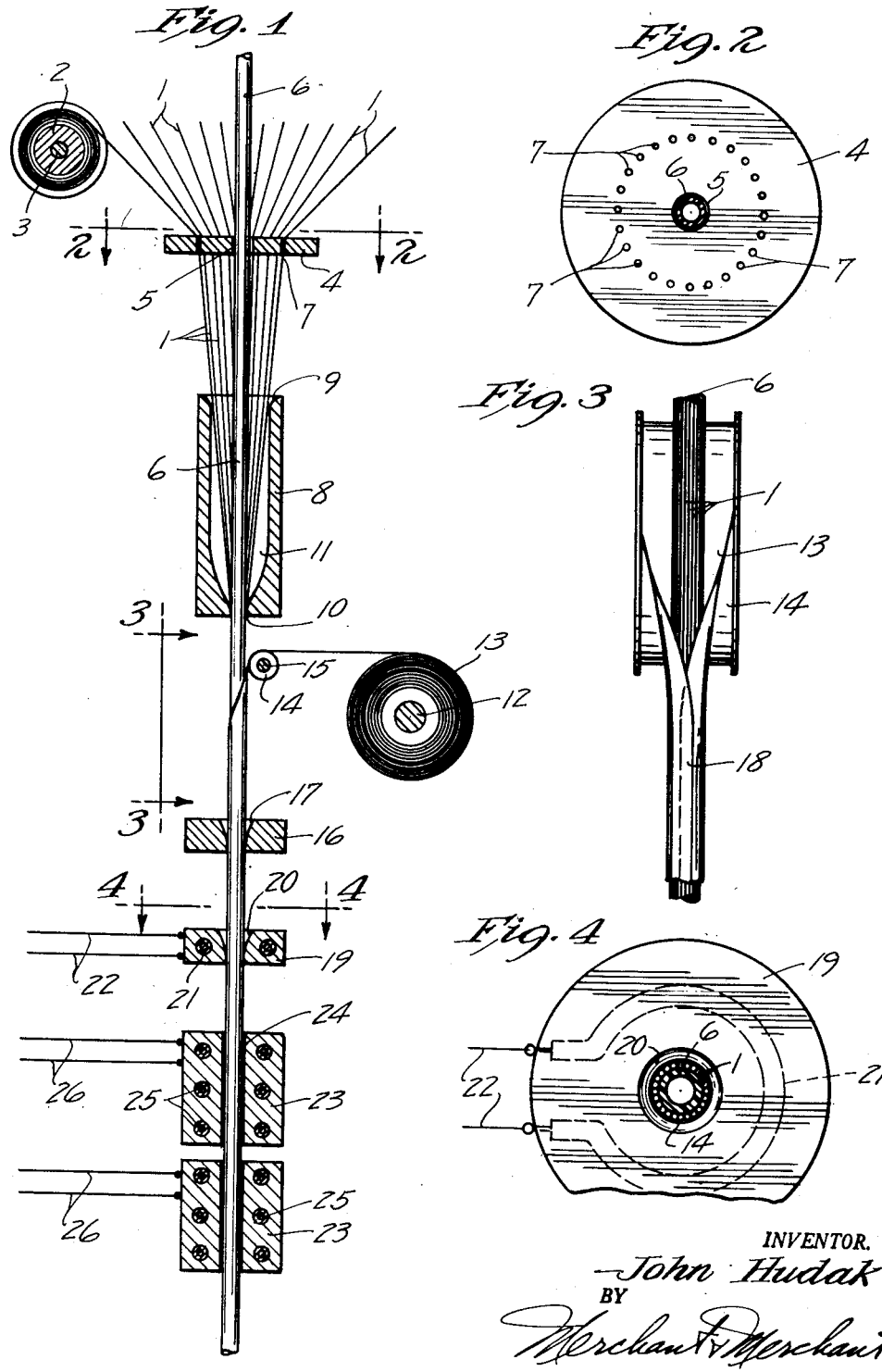
INVENTOR.
John Hudak
BY
Merchant & Merchant
ATTORNEYS

United States Patent Office 2,816,595
Patented Dec. 17, 1957

2,816,595

APPARATUS FOR REINFORCING AND COATING RODS

John Hudak, Minneapolis, Minn., assignor to The Paul Bunyan Bait Company, Minneapolis, Minn., a corporation of Minnesota Application September 27, 1954, Serial No. 458,499

4 Claims. (Cl. 154—1.7)

My invention provides a novel method of and apparatus for applying a protective and strength imparting coating to an elongated core.

More particularly, my invention provides a method of applying a coating to tubular core stock, which coating is relatively thin, which imparts great strength to said tubular core and which is relatively light in weight.

A still further object of my invention is the provision of a method of the type immediately above described for the treatment of tubular core whereby shafts, utilizable in the making of arrows and the like, may be produced which have walls of uniform thickness throughout their length and which have smooth glossy finishes completely free of any circumferentially extended ridges or relief.

A still further object of my invention is the provision of a novel method of the class above described which is relatively inexpensive to practice, which incorporates a minimum of working parts and which requires a minimum of material, servicing, maintenance, and replacement of parts.

The above and still further important objects and advantages of my invention will become apparent from the following detailed specification, appended claims and attached drawings.

Referring to the drawings wherein like characters indicate like parts throughout the several views:

Fig. 1 is a diagrammatic view, some parts being shown in elevation and some in vertical axial section;

Fig. 2 is an enlarged view partly in section and partly in plan as seen from the line 2—2 of Fig. 1;

Fig. 3 is an enlarged fragmentary view in side elevation as seen substantially from line 3—3 of Fig. 1; and Fig. 4 is an enlarged fragmentary view partly in transverse section and partly in plan as seen from the line 4—4 of Fig. 1, some parts being broken away.

Referring with greater particularity to the drawings, the numeral 1 indicates filaments or threads of glass or the like having great tensile strength. Each of the circumferentially spaced fibers 1 is unwound from a spool 2, a plurality of such spools being circumferentially spaced about the axis of the core. Only one of such spools is shown and same is mounted for rotary movements on a horizontal spindle 3. It goes without saying that for each of the filaments 1 shown there would be a spool 2 and spindle 3, similar to that shown in Fig. 1.

A guide element in the nature of a plate 4 is provided with a central aperture 5 for the reception of a length of core 6 to be reinforced and treated by my novel method. The core 6 may well be tubular or solid and may be formed from any suitable material such as high impact styrene. Radially outwardly from the core guiding aperture 5 are a plurality of circumferentially spaced guide apertures 7 for the reception, one each, of one of the filaments 1.

Positioned below and in spaced relationship to the guide plate 4 is an applying means for applying a thermosetting plastic resin material to the reinforcing filamentary material 1 and the core 6 which includes a saturation pot 8 which has an enlarged opening 9 at its upper end and a greatly reduced opening 10 at its lower end. The openings 9 and 10 are axially aligned with the aperture 5 in the guide plate 4. Between the openings 9 and 10 in the saturation pot 8, a reservoir 11 for the thermosetting plastic such as polyester resin or the like is provided. It will be noted that the fibers 1 converge toward the core 6 within the reservoir 11. This assures complete saturation of the filaments 1 and the exterior surface of the core 6 with the thermosetting plastic. The opening 10 is of a diameter to force the saturated filaments 1 into engagement with the exterior surface of the core 6 in side by side relationship parallel to the axis thereof while preventing escape of excessive amounts of the plastic.

Laterally offset from the apertures 5, 9 and 10 is a spindle 12 upon which a spool of tape, preferably thermoplastic tape such as Cellophane, 13, is mounted for rotation. Below the saturation pot 8 and in spaced relation thereto is a horizontally disposed tape guiding member, preferably and as shown in the nature of a horizontally disposed roller 14 arranged substantially tangentially to the covered core. The peripheral surface 15 of the roller 14 is located sufficiently close to the surface of the core 6, projecting downwardly from the saturation pot 8 so as to cause the tape 13 passing thereover to engage the saturated filaments 1. Downward movement of the core 6 from the saturation pot 8 causes unwinding of the tape 13 as same adheres upon impingement to the side thereof.

Below the guide roller 14 is a sizing die 16 having therein a sizing orifice 17 which diminishes in size from its upper inlet end to its lower discharge end. The aperture 17 is, of course, also axially aligned with the apertures 5, 9, and 10. Passage of the core 6, the saturated filaments 1, and the Cellophane tape through the sizing orifice 17 not only causes the tape to completely encompass or enclose the core 6 with the saturated filaments 1 thereabout (it is here important to note that the width of the tape 13 is such as to cause its opposite edges to overlap as indicated at 18) but also imparts uniform transverse dimensions thereto.

In closely spaced relation below the sizing die 16 is a sealing die 19 having a central aperture 20 therein for the reception of the core 6 with the saturated filaments 1 and the overlapped tape 13 thereabout. The aperture 20 is aligned with the apertures 5, 9, 10 and 17, and preferably and as shown likewise diminishes in cross-sectional diameter from its upper inlet towards its lower discharge end. Sealing die 19 is provided with a resistance heating coil 21, electrical current for which is supplied through lead wires 22. The diameter of the restricted discharge end of the seal aperture 20 is such as to insure sealing engagement between the overlapped edges 18 of the tape 13. An elongated tubular sheath or casing is thus provided for the core 6 with the saturated filaments thereabout.

Finally the core 6, so encased, is subjected to heat so as to impart a set to the plastic with which the surface of the core 6 and the filaments 1 have been saturated. Preferably, and as shown, this is done by passing the same through one or more annular heating units 23 having curing chambers 24 therein. Heat is imparted to the heating units 23 by means of heating coils or the like 25, electrical current to which is supplied through electrical lead wires 26. After curing, the Cellophane tape 13 may quickly be removed by bending the core 6. When the tape 13 has been removed, a glossy surface, almost completely free from any ridges, results. In fact the only ridge which does result is that caused by the overlapping of the opposite ends of the tape 13. This ridge would be only the thickness of the Cellophane tape used and would not be noticeable inasmuch as it extends longitudinally of the core 6. This is to be distinguished from the prior art method of spirally winding tape about the saturated filaments to create a sheath or casing. Under such conditions, not only is a far greater amount of tape required, but also continuous spiral grooves result where the tape overlaps. This is extremely objectionable and requires polishing to remove same.

My invention has been thoroughly tested and found to be completely satisfactory for the accomplishment of the above objects and while I have disclosed the preferred embodiment thereof, same is capable of modification without departure from the scope of the appended claims.

What I claim is:

1. Apparatus for applying a reinforced cover on a core, said apparatus including a first supply means for supplying filamentary reinforcing material over a core, a guide means for positioning the filamentary reinforcing material over the core, an applying means for applying thermosetting resin material to the filamentary reinforcing material and the core, a second supply means for supplying mold forming tape having longitudinally extending edges to the filamentary reinforced resin covered core, a compacting and sealing means for compacting the tape and filamentary reinforced cover tightly about the core with the longitudinal edges of the tape overlapped and extending substantially parallel to the longitudinal axis of the core and for sealing the so overlapped edges of the tape to form a mold for the covered core, said compacting and sealing means comprising at least a pair of spaced dies, one of said dies being a compacting and sizing die positioned along the longitudinal axis of the covered core subsequent the second supply means and having a tapered opening axially therethrough engaging the covered core and reducing same to a compact desired size, another of said dies being a sealing die longitudinally spaced along the longitudinal axis of the covered core in a direction subsequent to the said one die to engage and seal the overlapped edges of the tape and a curing means for curing the thermosetting resin, said compacting and sealing means being positioned intermediate the second supply means and the curing means.

2. The apparatus as set forth in claim 1 in which the said another die comprises an annular heating element having a tapered central aperture for receiving the covered core to further compact the covered core, said aperture being in alignment with the guide means, applying means and the opening in the one said die.

3. The apparatus as set forth in claim 1 together with a tape guide means positioned forward of said one die, said tape guide means comprising a roller element disposed substantially normal to the longitudinal axis of the covered core and substantially tangential to the covered core.

4. The apparatus as set forth in claim 1 wherein said resin material is a polyester resin and said filamentary reinforcing material is fiber glass.

References Cited in the file of this patent

UNITED STATES PATENTS

| | | |
|---|---|---|
| 1,951,301 | Angier et al. | Mar. 13, 1934 |
| 2,074,580 | Fourness et al. | Mar. 23, 1937 |
| 2,427,507 | Powell et al. | Sept. 16, 1947 |
| 2,528,152 | Landgraf | Oct. 30, 1950 |
| 2,571,717 | Howald et al. | Oct. 16, 1951 |
| 2,694,661 | Meyer | Nov. 16, 1954 |
| 2,751,320 | Jacobs et al. | June 19, 1956 |